United States Patent [19]

Sutker et al.

[11] Patent Number: 5,118,739
[45] Date of Patent: Jun. 2, 1992

[54] FLAME RETARDANT MACROMOLECULAR MATERIALS CONTAINING BROMINATED AROMATIC SULFONIC ACID SALTS

[75] Inventors: Burton J. Sutker, Edison, N.J.; Saadat Hussain, Baton Rouge, La.

[73] Assignee: Ethyl Corporation, Richmond, Va.

[21] Appl. No.: 540,761

[22] Filed: Jun. 20, 1990

[51] Int. Cl.$^5$ ............................................. C08K 5/42
[52] U.S. Cl. ........................................ 524/164; 524/163; 524/412
[58] Field of Search .................... 524/164, 163, 412

[56] References Cited

U.S. PATENT DOCUMENTS

| | | | |
|---|---|---|---|
| 3,940,366 | 2/1976 | Mark | 524/163 |
| 4,239,678 | 12/1980 | Williams | 524/164 |
| 4,315,849 | 2/1982 | Buxbaum et al. | 524/412 |
| 4,380,598 | 4/1983 | Robeson et al. | 524/164 |
| 4,486,560 | 12/1984 | Thomas | 524/100 |
| 4,552,911 | 11/1985 | Cohnen et al. | 524/94 |
| 4,555,540 | 11/1985 | Avakian | 524/412 |
| 4,579,896 | 4/1986 | Rosenquist | 524/163 |
| 4,663,380 | 5/1987 | Dozzi | 524/419 |

*Primary Examiner*—Paul R. Michl
*Assistant Examiner*—Edward Cain
*Attorney, Agent, or Firm*—David E. LaRose; Richard L. Hansen

[57] ABSTRACT

A novel flame retardant formulation comprising a flammable macromolecular material and a metal salt of a polybrominated sulfonic acid and having improved flame retardancy and enhanced U.V. stability.

4 Claims, No Drawings

FLAME RETARDANT MACROMOLECULAR MATERIALS CONTAINING BROMINATED AROMATIC SULFONIC ACID SALTS

BACKGROUND

This invention relates to sulfonic acid salt-based macro-molecular material formulations having improved flame retardance.

Flame retardants are widely used in macromolecular material formulations to reduce burning and flame propagation when articles made from such formulations are subjected to an ignition source. Present day flame retardants, while highly efficacious in accomplishing this primary function, are not always benign in their effect on the physical properties of the formulations into which they are incorporated. Thus, the flame retardant art is always searching for a better flame retardant.

THE INVENTION

In accordance with this invention, a novel macromolecular material formulation is provided comprising a flammable macromolecular material; a flame retardant amount of a metal salt of a polybrominated aromatic sulfonic acid; and optionally, a flame retardant synergist.

In addition to providing flame retardant properties, flammable macromolecular material formulations comprising the metal salt of the polybrominated aromatic sulfonic acid of this invention have enhanced U. V. stability.

The metal salt of the polybrominated aromatic sulfonic acid is useful in a wide variety of flammable macromolecular material formulations. Typically, the metal salts of the polybrominated sulfonic acid of this invention can be used in polycarbonate, poly(butyleneterephthalate), poly(ethyleneterephthalate), poly(methyleneterephthalate), and poly(phenyleneoxide). Other flammable macromolecular materials which may contain the metal salt of the polybrominated sulfonic acid as a flame retardant include high impact polystyrene; styrene copolymers; polyurethanes; polyamides; polyimides; acrylic resins; epoxy resins; alkyls; phenolics; elastomers; for example, butadiene/styrene copolymers and butadiene/acrylonitrile copolymers; terpolymers of acrylonitrile, butadiene and styrene; natural rubber; butyl rubber; and polysiloxanes. The flammable macromolecular material may also be a blend of the aforementioned polymers. Formulations of the flammable macromolecular materials may be polymers which contain any of the additives usually present and where appropriate to the particular polymers, may be crosslinked by chemical means or irradiation.

The flammable macromolecular material in the formulation comprises from about 50 weight percent to about 99.5 weight percent or more of the formulation. Preferably, the macromolecular material in the formulation ranges from about 70 weight percent to about 99.5 weight percent and most preferably from about 85 weight percent to about 95 weight percent.

The metal salt of the polybrominated aromatic sulfonic acid of this invention can be represented by the following formula

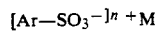

wherein Ar is preferably a dibrominated or tribrominated aryl radical; M is a suitable cation such as Al, Na, K, Ca, Cs, Mg, Be, Li, Sr, Ba, Rb, Fe, Co, Ni, Cu, Zn, and Mn; and n is a number corresponding to the valence of M. M is preferably an alkaline earth metal cation and most preferably M is Na, K, or Li. The aryl radical which is brominated may be a substituted or a non-substituted aryl, a di-aryl, or a polynuclear aryl radical such as benzyl, naphthyl, toluyl, diphenyl, and the like. Preferably Ar is 2,3-dibromophenyl, 2,4-dibromophenyl, 2,5-dibromophenyl, 2,6-dibromophenyl 2,3,5-tribromophenyl or 2,4,6-tribromophenyl. Most preferably, Ar is 2,5-dibromophenyl, or 2,4,6-tribromophenyl.

The amount of metal salt of the polybrominated aromatic sulfonic acid used in the formulation, is from an economical standpoint, the minimum amount needed to obtain the degree of flame retardancy being sought. In polycarbonate formulations, the amount of metal salt of the polybrominated aromatic sulfonic acid in the formulation will range from about 0.01 to about 5 weight percent and preferably from about 0.1 to about 4 weight percent based on the weight of the polycarbonate substrate. The other macromolecular materials of this invention will normally contain from about 5 to about 30 and preferably from about 10 to about 25 weight percent of the metal salt of the polybrominated aromatic sulfonic acid based on the weight of the macromolecular material(s).

The macromolecular material formulations of this invention are formed conventionally. For example, they can be formed with conventional mixers (Brabender or Banbury) or with an extruder.

In addition to the flammable macromolecular material and the metal salt of the polybrominated sulfonic acid in the formulation, other ingredients such as flame retardant synergists, melt flow improvers, pigments, dyes, lubricants, mold release agents, impact strength modifiers may also be used. These ingredients are art-recognized and are used in conventional quantities.

Flame retardant synergists which may be used with the formulations of this invention include antimony oxide, zinc borate, ferric oxide, etc. Such synergists may be employed in their customary concentration in the formulation.

When the flammable macromolecular material is a thermoplastic resin, formulations of this invention may also be filled, that is, they contain carbon or glass fibers or minerals, such as talc, mica, etc. The use of glass fibers is well known. The glass fibers can be incorporated into the thermoplastic formulations as a separate ingredient or can be added as a component of a commercially available glass-filled poly(alkene terephthalate) product, e.g. Valox ® 420, which is sold by General Electric Company, or Celanex ® 3300 which is sold by Hoechst Celanese. Generally, the amount of glass fiber used is that amount which is sufficient to give the desired enhancement of mechanical properties. The art teaches that from about 10 weight percent to about 50 weight percent is suitable, such weight percentages being based upon the total weight of the thermoplastic formulation.

The thermoplastic formulations of this invention can be formed into articles by conventional injection, extrusion, and blow molding techniques.

The practice and advantages of this invention will become still further apparent from the following illustrative examples.

EXAMPLE I

A series of blends were made on a Brabender using a commercially available polycarbonate (Merlon ® 40 from Mobay Chemical Company). Two blends of this invention using the sodium salt of 2,5-dibromobenzene sulfonate were made, one blend contained antimony oxide synergist and the other was devoid of a synergist. For comparative purposes similar blends were made using the commercial flame retardant ethylenediaminebis (tetrabromothalimide) and the sodium salt of 2,4,5-trichlorobenzene sulfonic acid. Compression molded specimens were then tested for flame retardancy and U.V. stability. The processing conditions used in making the blends and test specimens were as follows:

| | Processing Conditions | | |
|---|---|---|---|
| | Time, Min. | Temp. °C. | Ram Pressure Pounds |
| Brabender | 5 | 230 | — |
| Press | 5 | 280 | 1000 |

The compositions tested and the test results thereon are summarized in Table I.

TABLE I

Effectiveness of Flame Retardants in Polycarbonate

| Composition, parts by weight | A | B | C | D | E | F |
|---|---|---|---|---|---|---|
| Polycarbonate | 49.85 | 49.75 | 49.75 | 49.875 | 49.825 | 49.825 |
| Ethylenediamine-bis(tetrabromophthalimide) | 0.15 | — | — | 0.075 | — | — |
| 2,4,5-trichlorobenzene sulfonic acid, sodium salt | — | 0.25 | — | — | 0.125 | — |
| 2,5-dibromobenzene sulfonic acid, sodium salt | — | — | 0.25 | — | — | 0.125 |
| $Sb_2O_3$ (M & T) | — | — | — | 0.05 | 0.05 | 0.05 |
| Flame Retardancy UL-94 (⅛") | V-O | V-O | V-O | V-O | V-O | V-O |
| U.V. Stability (Sunlighter) | | | | | | |
| $Y.I._{313}$ (initial) | 36.29 | 31.40 | 26.66 | 34.86 | 29.71 | 31.13 |
| $Y.I._{313}$ (final) | 54.84 | 35.28 | 32.84 | 52.73 | 38.66 | 36.65 |
| $\Delta E_{48}$ | 9.51 | 3.81 | 2.78 | 7.11 | 3.88 | 4.73 |

EXAMPLE II

A series of blends were made using Noryl ® 731, a commercially available blend of poly-(2,6-dimethyl-1,4-phenylene oxide) and high impact polystyrene, with which had been blended an additional quantity of high impact polystyrene (HIPS 840D, Huntsman Chemical Corporation). The conventional flame retardant used in these tests was brominated polystyrene (Pyro-Chek ® 68PB). Other portions of such polymeric blends were treated pursuant to this invention with the sodium salt of 2,5-dibromobenzene antimony oxide (Thermogard ® S).

Compression molded samples of the resultant polymer blends were subjected to conventional physical property determinations including UL-94 flame retardancy tests. The makeup of the compositions and the test results thereon are summarized in Table II.

TABLE II

Effectiveness of the Sodium Salt of Dibromobenzene Sulfonate in Polyphenylene Oxide-Polystyrene Blends

| Composition, wt % | | | | |
|---|---|---|---|---|
| Noryl ® 731[1] | 53.55 | 54.35 | 50.35 | 53.55 |
| HIPS 840D | 26.75 | 27.2 | 25.15 | 26.75 |
| Thermogard ® S[2] | 3.7 | 3.7 | 3.7 | 3.7 |
| Pyro-Chek ® 68PB[3] | 11.0 | 9.75 | — | — |
| Sodium 2,5-dibromobenzene sulfonate | — | — | 15.8 | 11.0 |
| Hatcol ® 5170[4] | 5.0 | — | 5.0 | 5.0 |
| Pennwalt FR-40B | — | 5.0 | — | — |
| Physicals | | | | |
| UL-94 (1/16") | V-0 | V-0 | V-0 | V-1 |
| UL-94 (⅛") | V-0 | V-0 | Burn | Burn |
| HDT-264 (°C.) | 86 | 98 | 91 | 89 |
| U.V. Stability (Sunlighter) | | | | |
| Y.I. (initial) | 10.7 | 9.5 | 5.4 | 7.5 |
| Y.I. (final) | 40.4 | 50.6 | 30.8 | 32.2 |
| $\Delta E_{48}$ | 15.2 | 21.4 | 13.7 | 13.3 |

[1]Noryl ® 731 is a poly(phenylene oxide) of the General Electric Company.
[2]Thermogard ®-S is an antimony trioxide product of Atochem.
[3]Pyro-chek ® 68PB is a brominated polystyrene of Ferro Corporation.
[4]Hatcol ® 5170 is a polyol ester product of Hatco Corp.

The $\Delta E_{48}$ values which are indicative of the UV stability of the formulation, are obtained by placing the test plaque made from a macromolecular material formulation in a Sunlighter 150 from Test-Lab Apparatus Company for a period of 48 hours. The bulbs used in the Sunlighter 150 are from George W. Gates and Company and are designated as RS-4/G (100 watts). Before and after the 48-hour period the L, a, and b Hunter color values are determined with a Lab Scan II from Hunter Associates Laboratory. The $\Delta E_{48}$ value is then calculated using the formula $$\Delta E_{48} = \sqrt{\Delta L^2 + \Delta a^2 + \Delta b^2}$$

wherein $\Delta L = L_{initial} - L_{final}$, $\Delta a = a_{initial} - a_{final}$ and $\Delta b = b_{initial} - b_{final}$.

Example III sets forth a procedure for the preparation of the sodium salt of 2,5-dibromobenzene sulfonate.

EXAMPLE III

A one liter resin kettle, equipped with a mechanical stirrer, a thermometer, reflux condenser and a heating mantle was charged with 1,4-dibromobenzene (189.0g, 0.80 mole). With stirring was now added 234.4g of 30% oleum (234.4g oleum is =0.88 mole of $SO_3$ content) at room temperature in about ten minutes. The contents were heated to 100–103.C. and maintained there for six hours, at the end of which the contents were in the form of a gray solution. The contents were cooled to room temperature (solidification occurs at 60°C.) and then treated with 720 mL of 2 N sodium hydroxide solution (watch for initial exotherm and vigorous reaction) in about 30 minutes. The reaction slurry was now stirred at 100°C. for three hours, cooled and filtered followed by washing with 6×100 mL of cold water to remove excess NaOH. The product was dried in an oven at 100°C. overnight. A white crystalline solid was obtained in 84% yield (226.5g) having a bromine content of 47.1% and a melting point >500°C.

The formulations of this invention are subject to considerable variation within the spirit and scope of the appended claims.

What is claimed is:

1. A formulation comprising
   a) a flammable macromolecular material;
   b) about 10 to about 25 weight percent with respect to said macromolecular material of a metal salt of a polybrominated aromatic sulfonic acid; and
   c) optionally, a flame retardant synergist
   wherein said flammable macromolecular material is a poly(phenylene oxide).

2. The formulation of claim 1, wherein said flame retardant synergist is antimony oxide.

3. A thermoplastic formulation comprising:
   a) a poly(phenylene oxide);
   b) from about 10 to about 25 weight percent of a metal salt of a dibrominated aromatic sulfonic acid comprised predominantly of sodium 2,5-dibromobenzene sulfonate; and
   c) optionally, antimony oxide.

4. A formulation consisting essentially of
   a) a single flammable macromolecular material;
   b) a flame retardant amount of a metal salt of a polybrominated aromatic sulfonic acid; and
   c) a flame retardant synergist
   wherein said flammable macromolecular material is poly(phenylene oxide) and wherein said salt of a polybrominated aromatic sulfonic acid is sodium 2,5-dibromobenzene sulfonate or sodium 2,4,6-tribromobenzene sulfonate.

* * * * *

UNITED STATES PATENT AND TRADEMARK OFFICE
CERTIFICATE OF CORRECTION

PATENT NO.  : 5,118,739

DATED       : JUNE 02, 1992

INVENTOR(S) : BURTON J. SUTKER, ET AL.

It is certified that error appears in the above-identified patent and that said Letters Patent is hereby corrected as shown below:

On title page, item [56] add the following:

References Cited
U. S. PATENT DOCUMENTS

| | | | | |
|---|---|---|---|---|
| -- | 3,919,167 | 11/75 | Mark.................. | 260/45.8 |
| -- | 3,931,100 | 1/76  | Mark.................. | 260/45.7 |
| -- | 4,007,155 | 2/77  | Mark.................. | 260/45.7 |
| -- | 4,039,509 | 8/77  | Mark.................. | 260/45.8 |
| -- | 4,983,589 | 6/78  | Factor et al......... | 260/45.75 |
| -- | 4,104,253 | 8/78  | Mark.................. | 260/45.8 |
| -- | 4,208,489 | 6/80  | Schmidt et al........ | 525/146 |
| -- | 4,254,015 | 3/81  | Thomas et al......... | 260/45.9 |
| -- | 4,263,201 | 4/81  | Mark et al........... | 260/45.7 |
| -- | 4,303,575 | 12/81 | Reinert............... | 260/45.8 |
| -- | 4,320,049 | 3/82  | Krishnan et al....... | 525/94   -- |

Signed and Sealed this

Fourteenth Day of September, 1993

Attest:

BRUCE LEHMAN

Attesting Officer

Commissioner of Patents and Trademarks